United States Patent [19]

Oles

[11] 4,145,451

[45] Mar. 20, 1979

[54] PRESERVATION OF LOW ACID FOOD PRODUCTS IN THE ABSENCE OF CHEMICAL PRESERVATIVES

[75] Inventor: John G. Oles, Glenview, Ill.

[73] Assignee: Kraft, Inc., Glenview, Ill.

[21] Appl. No.: 791,173

[22] Filed: Apr. 27, 1977

[51] Int. Cl.² ............................................. A23L 1/24
[52] U.S. Cl. .................................... 426/321; 426/602; 426/605; 426/613; 426/589
[58] Field of Search ............... 426/602, 605, 613, 589, 426/321, 271

[56] References Cited

U.S. PATENT DOCUMENTS

| | | | |
|---|---|---|---|
| 2,264,593 | 12/1941 | Schapiro | 426/605 |
| 2,890,120 | 6/1959 | Makower | 426/321 |
| 3,300,318 | 1/1967 | Szczesniak | 426/605 |
| 3,955,010 | 5/1976 | Chozianin | 426/605 |

*Primary Examiner*—Jeanette M. Hunter
*Attorney, Agent, or Firm*—Fitch, Even, Tabin & Luedeka

[57] ABSTRACT

Preservation of low acid food products in the absence of chemical preservatives with the combination of acetic acid and phosphoric acid.

28 Claims, No Drawings

PRESERVATION OF LOW ACID FOOD PRODUCTS IN THE ABSENCE OF CHEMICAL PRESERVATIVES

The present invention relates generally to the preservation of food against microbiological spoilage and particularly to the preparation of food products which are resistant to yeast and mold growth. More particularly, the present invention is directed to a method for preventing spoilage of food containing low levels of acid in the absence of chemical food preservatives conventionally used to inhibit yeast and mold growth, and to such food products.

Food spoilage may result from the unwanted growth of bacteria, yeasts, and/or molds. In food products where acid is present, generally for the purpose of imparting a tart flavor, the pH is sufficiently low that bacteria that are dangerous to the public health do not grow. However, yeasts and molds do grow under these pH conditions and the present invention is described in connection with the preservation of food products against spoilage by yeast and mold. It is to be understood, however, that the present invention also affords preservation against bacterial spoilage.

It is well known that sugar and organic acids, e.g., acetic acid from vinegar, are useful for the preservation of food products, such as salad dressing, mayonnaise, and condiments. When the food is not pasteurized and chemical preservative agents, such as sodium benzoate, are omitted from the formulation, the food product must contain relatively large quantities of sugar and/or acid for preservation against yeast and mold growth.

The relationship between the requirements of sugar and acid for the preservation of food products in the absence of chemical preservatives has been reported by Bell and Etchells, Food Technology, December 1952, 468–471. In accordance with the studies of Bell and Etchells, it was determined that as the level of sugar decreased in a simulated food product, the level of acetic acid must be increased above a minimum level to preserve the food product against yeast and mold growth.

A graph was presented in the Bell and Etchells article which predicted the level of acetic acid required for a given level of sugar in the food product. This graph has been verified by extensive testing and is widely used in the pickling and salad dressing industry. The graph is commonly referred to as the "Bell-Etchells Curve." In accordance with the Bell-Etchells Curve the level of acetic acid required to stabilize a food product having low levels of sugar (5–10 percent) is in excess of 4.0 percent by weight acetic acid, based on the weight of moisture present, i.e., volume percent of acetic acid. This amount of acid produces unacceptable flavors in many food products having relatively bland flavor, for example, dressings for salads. Similarly, many bland food products become unacceptably sweet when high levels of sugar are present. Therefore, chemical preservatives have typically been used in order to preserve these food products.

It has been determined, as set forth in U.S. Pat. No. 3,955,010, to Chozianin et al., that the level of acetic acid required in a high moisture low fat emulsified oil dressing for preservation against bacterial growth can be greatly reduced if the level of bacterial nutrient ingredients is reduced to a level of less than about 1.0 percent by weight of the composition. However, the oil dressing compositions of the Chozianin et al. patent are not completely preserved against spoilage in the absence of a chemical preservative such as sodium benzoate.

In accordance with the present invention, it has been discovered that food products such as dressings for salad that contain low acid levels may be preserved against spoilage in the absence of chemical preservatives by including a small but effective amount of phosphoric acid in the food composition.

Accordingly, it is a principal object of the present invention to provide a method for the preservation of food products against spoilage in the absence of chemical preservatives.

It is another object of the present invention to provide food products having reduced levels of acetic acid or other organic food acid at given sugar contents which are preserved against spoilage in the absence of chemical preservatives.

It is a further object of the present invention to provide dressings for salads containing low levels of acetic acid and phosphoric acid which are stable against spoilage in the absence of preservative agents.

These and other objects of the invention will become more apparent from the following detailed description.

In accordance with various features of the present invention, food compositions are prepared which are stable against spoilage without the presence of chemical preservatives, but which contain less acetic acid than has been previously thought necessary. The food compositions of the present invention contain a synergistic combination of acetic acid or other organic food acid and phosphoric acid. The total level of acid is below the total level of acid previously predicted to preserve food products for any given level of sugar present in the food product.

The method of the present invention provides for the preparation of food products which are stable against spoilage in the absence of chemical preservatives. The dressing products contemplated by the present invention include oil or oilless, pourable or viscous, emulsified or nonemulsified food products commonly used as an adjunct on salads, vegetables, sandwiches, and the like. Included within such classification are products such as mayonnaise, salad dressing, and French dressing, and imitations thereof, for which federal standards have been created, as well as low calorie oilless products, including condiments, and emulsified and nonemulsified oil-containing products for which no federal standards exist.

In general, the food compositions contemplated by the present invention may have any of the ingredients listed hereinbelow at the indicated level. As used herein, percent acetic and/or phosphoric acid is expressed as weight percent based on the total moisture present. All other references to percent are to weight percent of the total composition.

| Ingredient | Weight Percent |
|---|---|
| Oil | 0–60 |
| Moisture | 20–96 |
| Egg Yolk | 0–20 |
| Milk Solids Not Fat | 0–15 |
| Sweetener | 0–30 |
| Salt | 0–5 |
| Gums | 0–15 |
| Starch | 0–20 |
| Spices and Flavors | 0–15 |
| Acetic Acid | 0.05–1.8 |

-continued

| Ingredient | Weight Percent |
|---|---|
| Phosphoric Acid | 0.1–1.5 |

A typical high oil-containing dressing for salad, which may be either pourable or semisolid, might have the following composition:

| | Weight Percent | |
|---|---|---|
| Ingredient | Range | Specific Example |
| Oil | 30–60 | 50.0 |
| Moisture | 20–50 | 38.65 |
| Egg Yolk | 0–8 | 4.0 |
| Sweetener | 0–4 | 2.0 |
| Salt | 0–4 | 1.5 |
| Starch | 0–4 | 0.0 |
| Gum | 0–1.5 | 0.75 |
| Spices and Flavors | 0–5 | 2.0 |
| Acetic Acid | 0.05–1.8 | 1.0 |
| Phosphoric Acid | 0.1–1.5 | 0.1 |

A typical low oil-containing dressing for salad, which may be either pourable or semisolid, might have the following composition:

| | Weight Percent | |
|---|---|---|
| Ingredient | Range | Specific Example |
| Oil | 10–15 | 10.0 |
| Moisture | 35–90 | 64.5 |
| Sweetener | 0–10 | 8.0 |
| Egg Yolk | 0–7 | 4.0 |
| Salt | 0–4 | 2.0 |
| Starch | 0–10 | 6.0 |
| Gum | 0–11 | 1.5 |
| Spices and Flavors | 0–5 | 2.8 |
| Acetic Acid | 0.05–1.8 | 1.0 |
| Phosphoric Acid | 0.1–1.5 | 0.2 |

A typical oilless dressing, for example, for condiments, might have the following composition:

| | Weight Percent | |
|---|---|---|
| Ingredient | Range | Specific Example |
| Oil | < 1.5 | 1.0 |
| Moisture | 55–96 | 65.3 |
| Egg Yolk | 0–20 | 5.0 |
| MSNF | 0–15 | 5.0 |
| Sweetener | 0–30 | 10.0 |
| Salt | 0–5 | 2.0 |
| Gum | 0–15 | 1.5 |
| Starch | 0–20 | 6.0 |
| Spices and Flavors | 0–15 | 3.0 |
| Acetic Acid | 0.05–1.8 | 1.0 |
| Phosphoric Acid | 0.1–1.5 | 0.2 |

These formulations are presented by way of example only and other formulations for dressings for salads are well known in the art. Similarly, techniques for the manufacture of dressing products of the types described herein are well known and within the skill of the art.

The ingredients that are utilized in compositions are also well known. The oil may be any of the well known triglyceride oils derived from oil seeds, for example, corn oil, soybean oil, safflower oil, cottonseed oil, etc., or mixtures thereof. The sweetener used is typically sucrose. However, other sweeteners such as dextrose, fructose, corn syrup solids, and synthetic sweeteners are contemplated. When a nonsucrose sweetener is used, the level of use is determined based upon its sweetening power, calculated as sucrose, in accord with conventional practice.

The egg yolk may be from whole eggs, liquid egg yolk, or dried egg yolk, and may be fresh or frozen. In the formulations herein the egg yolk content is expressed in terms of liquid egg yolk. The gums, starches, spices, and flavors that may be used are those conventionally employed for food uses. In general, if a gum is employed, the starch is omitted and vice versa. However, in some instances it may be desirable to employ both a gum and a starch to achieve a particular end result.

In accordance with the present invention, a synergistic combination of phosphoric acid and acetic acid is added to a dressing product of the type set forth above. The respective amounts of phosphoric acid and acetic acid are selected in order to provide effective preservation of the dressing product against spoilage in the absence of chemical preservatives. It has been found that the moisture content of the dressing product has an effect on the amount of the respective acids required to achieve preservation. For example, at low levels of acetic acid, based upon the moisture present, a slightly greater amount of phosphoric acid, based upon the moisture present, is required to preserve an 80 percent moisture product than is required to preserve a 40 percent moisture product, and vice versa.

It has also been found that the level of sugars in the dressing product has a bearing on the preservation of the dressing. If no sugar is present, dressings with very low quantities of both acetic and phosphoric acids are preserved whereas essentially identical dressings containing small amounts of sugar, e.g., 1 to 2.5 percent, spoil. At the other end of the sugar range, it has been found that dressing products having sugar contents greater than 17 to 18 percent and low levels of both acetic and phosphoric acid are preserved whereas similar dressings containing 10 percent sugar are not preserved.

In practice, the relative amounts of acetic and phosphoric acid employed in any food composition are selected by first selecting that amount of acetic acid which provides the desired acid or tart flavor. Knowing the amount of acetic acid in the composition, and the amount of moisture and sugar in the composition, an amount of phosphoric acid effective to preserve the composition against spoilage is added. Obviously, the procedure could be reversed, but this could lead to compositions containing excessive amounts of acetic acid with resulting harsh flavors.

The present invention is principally directed to compositions of the mayonnaise and salad dressing type. These compositions are relatively bland in flavor and have low acetic acid content in order to provide the requisite flavor. Generally the acetic acid content should not exceed 1.8 percent, perferably 1.0 percent, in the presence of phosphoric acid, in order to impart the bland flavor. It is to be understood that the upper limit of 1.8 percent acetic acid is that amount normally found in dressing products, and other systems having greater acetic acid content and which employ the combination of acetic acid and phosphoric acid to preserve the composition against spoilage in the absence of chemical preservatives are within the scope of the invention. The acetic acid is typically incorporated in the formulation as vinegar of 100–120 grain strength, i.e., 10–12 percent acetic acid.

As indicated, the amount of phosphoric acid is selected based upon the amount of acetic acid in the composition. Generally only minor amounts of phosphoric acid are required, for example, 0.1 to 0.5 percent, based on moisture. The presence of phosphoric acid in an amount in excess of 1.5 percent may result in a composition having too low a pH and poor organoleptic and/or physical properties. Any food grade phosphoric acid may be used. Typically, 75–85 percent phosphoric acid solutions are used.

EXAMPLES

Various dressing formulations were prepared using conventional processing techniques to illustrate the present invention. The formulations are set forth in Tables I and II below. In addition, all formulations contained 5 percent egg yolk solids, 1.5 percent salt, 1 to 3 percent vegetable gums, and spices and flavors, with the exception of Sample 44 which has no gums.

The ingredients were mixed together in accordance with typical practices, homogenized and/or emulsified to form a semisolid dressing, and packed into jars. No chemical preservatives were included in any of the samples.

Resistance to spoilage was determined by inoculating triplicate samples of each dressing composition with $10^4$ to $10^5$ mixed yeast strains per gram and by inoculating triplicate samples with $10^4$ to $10^5$ mixed mold strains per gram. The samples were incubated at room temperature and plate counts, using standard microbiological procedures, were made after 1, 2, and 4 weeks. The term D/C means the test was terminated because of rampant growth.

TABLE I

| | | 40% Moisture | | | | | | |
|---|---|---|---|---|---|---|---|---|
| | | Weight Percent Based on Moisture | | | | Fourth Week | | Effective |
| Sample | % Fat | $H_3PO_4$ | HAC | pH | % Sugar | Yeast | Mold | Preservation |
| 1 | 45.0 | 0. | 1.6 | 2.82 | 10.0 | D/C | $10^2$ | No |
| 2 | 47.0 | 0.1 | 0.1 | 2.35 | 10.0 | $10^5$ | $10^2$ | No |
| 3 | 47.5 | 0.1 | 0.4 | 2.40 | 10.0 | D/C | $10^2$ | No |
| 4 | 47.0 | 0.1 | 0.8 | 2.20 | 10.0 | $10^5$ | 10 | No |
| 5 | 42.8 | 0.1 | 1.2 | 2.30 | 10.0 | $10^4$ | 10 | No |
| 6 | 47.2 | 0.1 | 1.6 | 2.30 | 10.0 | $10^3$ | 10 | Yes |
| 7 | 56.8 | 0.1 | 0.1 | 2.30 | 0.0 | $10^4$ | $10^4$ | Yes |
| 8 | 56.5 | 0.1 | 0.1 | 2.20 | 1.0 | $10^5$ | $10^3$ | No |
| 9 | 55.3 | 0.1 | 0.1 | 2.20 | 2.5 | $10^5$ | $10^3$ | No |
| 10 | 58.4 | 0.1 | 0.2 | 2.40 | 0.0 | $10^3$ | $10^1$ | Yes |
| 11 | 56.6 | 0.1 | 0.2 | 2.00 | 1.0 | $10^4$ | $10^3$ | Yes |
| 12 | 55.2 | 0.1 | 0.2 | 2.40 | 2.5 | $10^5$ | $10^3$ | No |
| 13 | 46.9 | 0.15 | 0.3 | 2.30 | 10.0 | $10^5$ | $10^2$ | Borderline |
| 14 | 40.4 | 0.20 | 0.05 | 2.14 | 10.0 | $10^4$ | $10^2$ | Borderline |
| 15 | 47.9 | 0.20 | 0.075 | 2.21 | 10.0 | $10^3$ | $10^1$ | Yes |
| 16 | 48.2 | 0.20 | 0.10 | 2.22 | 10.0 | $10^3$ | $10^3$ | Yes |
| 17 | 46.8 | 0.25 | 0.1 | 2.10 | 10.0 | $10^2$ | $10^2$ | Yes |
| 18 | 46.5 | 0.3 | 0.05 | 2.10 | 10.0 | $10^3$ | $10^2$ | Yes |
| 19 | 46.6 | 0.3 | 0.075 | 2.11 | 10.0 | $10^1$ | $10^1$ | Yes |
| 20 | 46.2 | 0.3 | 0.1 | 1.80 | 10.0 | <10 | $10^1$ | Yes |
| 21 | 49.0 | 0.3 | 0.4 | 1.85 | 10.0 | <10 | <10 | Yes |
| 22 | 37.0 | 0.3 | 0.4 | 1.89 | 10.0 | $10^5$ | $10^3$ | Yes |
| 23 | 43.0 | 0.3 | 0.8 | 2.00 | 10.0 | <10 | <10 | Yes |
| 24 | 47.1 | 0.3 | 1.2 | 2.00 | 10.0 | <10 | <10 | Yes |
| 25 | 47.0 | 0.3 | 1.6 | 1.90 | 10.0 | <10 | <10 | Yes |
| 26 | 48.1 | 0.5 | 0.1 | 1.60 | 10.0 | <10 | $10^1$ | Yes |
| 27 | 45.4 | 0.5 | 0.4 | 1.63 | 10.0 | <10 | <10 | Yes |
| 28 | 35.6 | 0.5 | 0.8 | 1.75 | 10.0 | <10 | <10 | Yes |
| 29 | 47.3 | 0.5 | 1.2 | 1.70 | 10.0 | <10 | <10 | Yes |
| 30 | 47.8 | 0.5 | 1.6 | 1.70 | 10.0 | <10 | <10 | Yes |

TABLE II

| | | 80% Moisture | | | | | | |
|---|---|---|---|---|---|---|---|---|
| | | Weight Percent Based on Moisture | | Fourth Week | | Effective | | |
| Sample | % Fat | $H_3PO_4$ | HAC | pH | % Sugar | Yeast | Mold | Preservation |
| 31 | .31 | 0.1 | 0.05 | 2.40 | 17.5 | D/C | $10^4$ | No |
| 32 | 16.6 | 0.1 | 0.1 | 2.40 | 0. | $10^4$ | $10^3$ | Yes |
| 33 | 15.3 | 0.1 | 0.1 | 2.10 | 1.0 | $10^5$ | $10^3$ | No |
| 34 | 13.8 | 0.1 | 0.1 | 2.40 | 2.5 | D/C | $10^3$ | No |
| 35 | 6.0 | 0.1 | 0.1 | 2.35 | 10.0 | D/C | $10^3$ | No |
| 36 | 3.0 | 0.1 | 0.1 | 2.40 | 13.0 | D/C | $10^3$ | No |
| 37 | 1.5 | 0.1 | 0.1 | 2.50 | 15.0 | D/C | $10^3$ | No |
| 38 | 0. | 0.1 | 0.1 | 2.33 | 18.9 | <10 | $10^3$ | Yes |
| 39 | 14.0 | 0.1 | 0.2 | 2.40 | 0. | $10^3$ | $10^2$ | Yes |
| 40 | 15.2 | 0.1 | 0.2 | 2.50 | 1.0 | $10^5$ | $10^3$ | No |
| 41 | 14.3 | 0.1 | 0.2 | 2.20 | 2.5 | D/C | $10^3$ | No |
| 42 | .64 | 0.1 | 0.4 | 2.40 | 10.0 | D/C | $10^3$ | No |
| 43 | .18 | 0.1 | 0.4 | 2.55 | 18.0 | $10^6$ | $10^2$ | No |
| 44 | 0. | 0.1 | 0.4 | 2.28 | 19.0 | $10^2$ | <10 | Yes |
| 45 | 11.6 | 0.1 | 0.8 | 2.41 | 5.34 | $10^5$ | <10 | No |
| 46 | .9 | 0.1 | 0.8 | 2.30 | 10.0 | $10^4$ | $10^2$ | No |
| 47 | 0. | 0.1 | 0.8 | 2.30 | 18.5 | <10 | <10 | Yes |
| 48 | 1.3 | 0.1 | 1.2 | 2.30 | 10.0 | $10^4$ | $10^1$ | No |
| 49 | 2.2 | 0.1 | 1.6 | 2.35 | 10.0 | $10^4$ | $10^1$ | No |
| 50 | 7.6 | 0.15 | 0.3 | 2.20 | 10.0 | $10^5$ | $10^2$ | No |
| 51 | 7.5 | 0.2 | 0.05 | 2.17 | 10.0 | $10^5$ | $10^3$ | Borderline |
| 52 | 7.0 | 0.2 | 0.075 | 2.22 | 10.0 | $10^4$ | $10^3$ | Yes |
| 53 | 4.8 | 0.2 | 0.1 | 2.28 | 10.0 | $10^6$ | $10^3$ | Yes |
| 54 | 7.7 | 0.2 | 0.2 | 2.17 | 10.0 | $10^4$ | $10^3$ | Yes |
| 55 | 7.7 | 0.25 | 0.1 | 2.08 | 10.0 | $10^4$ | $10^3$ | Yes |
| 56 | 4.1 | 0.3 | 0.05 | 2.20 | 10.0 | $10^2$ | $10^4$ | Yes |
| 57 | 7.4 | 0.3 | 0.075 | 2.50 | 10.0 | $10^3$ | $10^2$ | Yes |

TABLE II-continued

| | | 80% Moisture | | | | | | |
|---|---|---|---|---|---|---|---|---|
| | | Weight Percent Based on Moisture | | Fourth Week | | Effective | | |
| Sample | % Fat | $H_3PO_4$ | HAC | pH | % Sugar | Yeast | Mold | Preservation |
| 58 | 6.1 | 0.3 | 0.1 | 1.90 | 10.0 | $10^1$ | $10^3$ | Yes |
| 59 | 7.0 | 0.3 | 0.4 | 2.11 | 10.0 | <10 | <10 | Yes |
| 60 | .9 | 0.3 | 0.4 | 1.90 | 10.0 | <10 | $10^1$ | Yes |
| 61 | 2.4 | 0.3 | 0.8 | 1.90 | 10.0 | <10 | <10 | Yes |
| 62 | 3.0 | 0.3 | 1.2 | 1.90 | 10.0 | <10 | <10 | Yes |
| 63 | .9 | 0.3 | 1.6 | 1.90 | 10.0 | <10 | <10 | Yes |
| 64 | 5.7 | 0.5 | 0.1 | 1.70 | 10.0 | <10 | $10^2$ | Yes |
| 65 | 1.3 | 0.5 | 0.4 | 1.70 | 10.0 | <10 | $10^1$ | Yes |
| 66 | 3.4 | 0.5 | 0.8 | 1.70 | 10.0 | <10 | <10 | Yes |
| 67 | 2.4 | 0.5 | 1.2 | 1.70 | 10.0 | <10 | <10 | Yes |
| 68 | 2.4 | 0.5 | 1.6 | 1.70 | 10.0 | <10 | <10 | Yes |

The synergistic effect obtained through the present invention is apparent from the fact that dressing products containing either as much as 1.6 percent acetic acid or 0.75 percent phosphoric acid (not included in the Tables) are not preserved, while similar dressing products containing 0.2 percent phosphoric acid and 0.05 or more percent acetic acid are preserved regardless of the moisture content. The effect of the amount of moisture is seen by the fact that at 40 percent moisture, 0.1 percent phosphoric acid and 1.6 percent acetic acid effect preservation (Sample 6); 0.15 percent phosphoric acid and 0.3 percent acetic acid is borderline (Sample 13); and 0.2 percent phosphoric acid and 0.05 percent acetic acid is borderline (Sample 14). However, at 80 percent moisture, 0.1 percent phosphoric acid and 1.6 percent acetic acid spoils (Sample 49); 0.15 percent phosphoric acid and 0.3 percent acetic acid spoils (Sample 50); 0.2 percent phosphoric acid and 0.05 percent acetic acid is borderline (Sample 51); and 0.2 percent phosphoric acid and 0.075 percent acetic acid is preserved (Sample 52).

The further effect of the sugar content may be seen by comparing Samples 7, 8, and 9; and 10, 11, and 12 at 40, percent moisture; and Samples 37, 38, and 39; 43 and 44; and 45, 46, and 47 at 80 percent moisture.

Samples 7, 8, and 9 reveal that when zero sugar is present in a dressing containing 40 percent moisture, preservation is achieved (Sample 7), while similar compositions containing 1 (Sample 8) and 2.5 (Sample 9) percent sugar are not preserved when 0.1 percent phosphoric acid and 0.1 percent acetic acid are present. Samples 10, 11, and 12 show that when the acetic acid level is increased to 0.2 percent in similar compositions, preservation is achieved at 0 (Sample 10) and 1 (Sample 11) percent sugar but is not achieved at 2.5 (Sample 12) percent sugar.

Samples 37 and 38 show that in high moisture compositions when the sugar is increased from 15 to 19 percent, preservation is achieved. Sample 39 confirms the results of Samples 10, 11, and 12. Samples 43 and 44 confirm the results of Samples 37 and 38 at higher acetic acid concentrations. Samples 45, 46, and 47 further confirm the fact that high sugar content dressings, i.e., those containing in excess of 18 percent by weight sugar can be effectively preserved with as little as 0.1 percent phosphoric acid and 0.1 percent acetic acid. This may be desirable in sweet dressing where a harsh acid taste is undesired. The fact that preservation is achieved at very low sugar concentrations is important from the standpoint that compositions of the type disclosed in U.S. Pat. No. 3,955,010 may be prepared without the addition of any chemical preservatives.

The present invention provides a flexible and useful method for the preservation of food products against microbiological spoilage at reduced levels of acid without the use of a chemical preservative such as sodium benzoate. Food products can be prepared in accordance with the method of the present invention which are organoleptically desirable, bland in taste and with enhanced perception of delicate flavors.

What is claimed is:

1. A preserved food composition comprising a food and between 0 and about 60 percent by weight edible oil, between about 30 and about 96 percent by weight moisture, between 0 and about 30 percent by weight sweetener, as sucrose equivalent, balance food solids and a preserving system containing between about 0.05 and about 1.8 percent by weight, based on the total moisture content of the food composition, acetic acid, and between about 0.1 and about 1.5 percent by weight, based on the total moisture content of the food composition, phosphoric acid, the amount of phosphoric acid being based on the amount of moisture, sweetener, and acetic acid such that said food composition is preserved against microbiological spoilage in the absence of chemical preservatives.

2. A food composition in accordance with claim 1 containing at least about 0.2 percent by weight, based on moisture, phosphoric acid.

3. A food composition in accordance with claim 2 containing at least about 0.1 percent by weight, based on moisture, acetic acid.

4. A food composition in accordance with claim 3 containing between about 40 and about 80 percent moisture.

5. A salad dressing comprising between about 30 and about 60 percent by weight edible oil, between about 20 and about 50 percent by weight moisture, between 0 and about 8 percent by weight egg yolk, between 0 and about 4 percent by weight sweetener, as sucrose equivalent, between 0 and about 4 percent by weight salt, between 0 and about 4 percent by weight starch, between 0 and about 1.5 percent gum, between 0 and about 5 percent by weight spices and flavors, between about 0.05 and about 1.8 percent by weight, based on total moisture content of the food composition, acetic acid, and between about 0.1 and about 1.5 percent by weight, based on total moisture content of the food composition, phosphoric acid, said salad dressing being preserved against microbiological spoilage in the absence of chemical preservatives.

6. A salad dressing in accordance with claim 5 containing at least about 0.2 percent by weight, based on moisture, phosphoric acid.

7. A salad dressing in accordance with claim 6 containing at least about 0.1 percent by weight, based on moisture, acetic acid.

8. A salad dressing comprising between about 10 and about 15 percent by weight edible oil, between about 35 and about 90 percent by weight moisture, between 0 and about 10 percent by weight sweetener, as sucrose equivalent, between 0 and about 7 percent by weight egg yolk, between 0 and about 4 percent by weight salt, between 0 and about 10 percent by weight starch, between 0 and about 11 percent by weight gum, between 0 and about 5 percent by weight spices and flavors, between about 0.05 and about 1.8 percent by weight, based on total moisture content of the food composition, acetic acid, and between about 0.1 and about 1.5 percent by weight, based on total moisture content of the food composition, phosphoric acid, said salad dressing being preserved against microbiological spoilage in the absence of chemical preservatives.

9. A salad dressing in accordance with claim 8 containing at least about 0.2 percent by weight, based on moisture, phosphoric acid.

10. A salad dressing in accordance with claim 9 containing at least about 0.1 percent by weight, based on moisture, acetic acid.

11. A dressing composition comprising less than about 1.5 percent by weight edible oil, between about 55 and about 96 percent by weight moisture, between 0 and about 20 percent by weight egg yolk, between 0 and about 15 percent by weight milk solids nonfat, between 0 and about 30 percent by weight sweetener, as sucrose equivalent, between 0 and about 5 percent by weight salt, between 0 and about 15 percent by weight gum, between 0 and about 20 percent by weight starch, between 0 and about 15 percent by weight spices and flavors, between 0.05 and 1.8 percent by weight, based on total moisture content of the food composition, acetic acid, and between 0.01 and 1.5 percent by weight, based on the total moisture content of the food composition, phosphoric acid, said dressing being preserved against microbiological spoilage in the absence of chemical preservatives.

12. A dressing in accordance with claim 11 containing at least about 0.2 percent by weight, based on moisture, phosphoric acid.

13. A dressing in accordance with claim 12 containing at least about 0.1 percent by weight, based on moisture, acetic acid.

14. A method of preparing a preserved food composition containing a food and between 0 and about 60 percent by weight edible oil, between about 20 and about 96 percent by weight moisture, and between 0 and about 30 percent by weight sweetener, as sucrose equivalent balance food solids, against microbiological spoilage in the absence of chemical preservatives, comprising incorporating in said food composition an effective amount of a mixture of between about 0.05 and about 1.8 percent by weight acetic acid, based on total moisture content of the food composition, and between about 0.1 and about 1.5 percent by weight phosphoric acid, based on total moisture content of the food composition.

15. A method in accordance with claim 14 wherein at least about 0.2 percent by weight, based on moisture, phosphoric acid is incorporated in said food composition.

16. A method in accordance with claim 15 wherein at least about 0.1 percent by weight, based on moisture, acetic acid is incorporated in said food composition.

17. A method of preserving a salad dressing containing between about 30 and about 60 percent by weight edible oil, between about 20 and about 50 percent by weight moisture, between 0 and about 30 percent by weight sweetener, as surcrose equivalent, between 0 and about 8 percent by weight egg yolk, between 0 and about 4 percent by weight salt, between 0 and about 4 percent by weight starch, between 0 and about 1.5 percent by weight gum, and between 0 and about 5 percent by weight spices and flavors, against microbiological spoilage in the absence of chemical preservatives comprising incorporating in said salad dressing an effective amount of a mixture of between about 0.05 and about 1.8 percent by weight acetic acid, based on total moisture content of the food composition, and between about 0.1 and about 1.5 percent by weight phosphoric acid, based on total moisture content of the food composition.

18. A method in accordance with claim 17 wherein at least about 0.2 percent by weight, based on moisture, phosphoric acid is incorporated in said salad dressing.

19. A method in accordance with claim 18 wherein at least about 0.1 percent by weight, based on moisture, acetic acid is incorporated in said salad dressing.

20. A method of preserving a salad dressing containing between about 10 and about 15 percent by weight edible oil, between about 35 and about 90 percent by weight moisture, between 0 and about 10 percent by weight sweetener, as sucrose equivalent, between 0 and about 7 percent by weight egg yolk, between 0 and about 4 percent by weight salt, between 0 and about 10 percent by weight starch, between 0 and about 11 percent by weight gum, and between 0 and about 15 percent by weight spices and flavors against microbiological spoilage in the absence of chemical preservatives comprising incorporating in said salad dressing an effective amount of a mixture of between about 0.05 and about 1.8 percent by weight acetic acid, based on total moisture content of the food composition, and between about 0.1 and about 1.5 percent by weight phosphoric acid, based on total moisture content of the food composition.

21. A method in accordance with claim 20 wherein at least about 0.2 percent by weight, based on moisture, phosphoric acid is incorporated in said salad dressing.

22. A method in accordance with claim 21 wherein at least about 0.1 percent by weight, based on moisture, acetic acid is incorporated in said salad dressing.

23. A method of preserving a dressing containing less than about 1.5 percent by weight edible oil, between about 55 and about 96 percent by weight moisture, between 0 and about 30 percent by weight sweetener, as sucrose equivalent, between 0 and about 20 percent by weight egg yolk, between 0 and about 5 percent by weight salt, between 0 and about 15 percent by weight milk solids nonfat, between 0 and about 20 percent by weight starch, between 0 and about 15 percent by weight gum, and between 0 and about 15 percent by weight spices and flavors against microbiological spoilage in the absence of chemical preservatives comprising incorporating in said dressing an effective amount of a mixture of between about 0.05 and about 1.8 percent by weight acetic acid, based on total moisture content of the food composition, and between about 0.1 and about 1.5 percent by weight phosphoric acid, based on total moisture content of the food composition.

24. A method in accordance with claim 23 wherein at least about 0.2 percent by weight, based on moisture, phosphoric acid is incorporated in said dressing.

25. A method in accordance with claim 24 wherein at least about 0.1 percent by weight, based on moisture, acetic acid is incorporated in said dressing.

26. A dressing composition comprising about 50 percent by weight edible oil, about 4 percent by weight egg yolk, about 2 percent by weight sweetener, calculated as sucrose, about 1.5 percent by weight salt, about 0.75 percent by weight gum, about 2 percent by weight spices and flavors, about 1.0 percent by weight, based on total moisture content of the food composition, acetic acid, about 0.1 percent by weight, based on total moisture content of the food composition, phosphoric acid, and the balance moisture, said dressing containing no chemical preservatives.

27. A dressing composition comprising about 10 percent by weight edible oil, about 8 percent by weight sweetener, calculated as sucrose, about 4 percent by weight egg yolk, about 2 percent by weight salt, about 6 percent by weight starch, about 1.5 percent by weight gum, about 1.5 percent by weight spices and flavors, about 1 percent by weight, based on total moisture content of the food composition, acetic acid, about 0.2 percent by weight, based on total moisture content of the food composition, phosphoric acid, and the balance moisture, said dressing containing no chemical preservatives.

28. A dressing composition comprising about 1 percent by weight edible oil, about 5 percent by weight egg yolk, about 5 percent by weight milk solids nonfat, about 10 percent by weight sweetener, calculated as sucrose, about 2 percent by weight salt, about 1.5 pounds by weight gum, about 6 percent by weight starch, about 3 percent by weight spices and flavors, about 1 percent by weight, based on total moisture content of the food composition, acetic acid, about 0.2 percent by weight, based on moisture, phosphoric acid, and the balance moisture, said dressing containing no chemical preservatives.

* * * * *

UNITED STATES PATENT AND TRADEMARK OFFICE
CERTIFICATE OF CORRECTION

PATENT NO. : 4,145,451
DATED : March 20, 1979
INVENTOR(S) : John G. Oles

It is certified that error appears in the above-identified patent and that said Letters Patent are hereby corrected as shown below:

Column 7, line 38, delete "," after "40".

Column 8, line 26, delete "a food".

Column 8, line 27, delete "and" first occurrence.

Column 9, line 51, delete "a food and".

Column 12, line 15, change "pounds" to "percent".

Signed and Sealed this

Eighth Day of January 1980

[SEAL]

Attest:

SIDNEY A. DIAMOND

Attesting Officer

Commissioner of Patents and Trademarks